(No Model.)
J. BIRTWISLE.
TOOL FOR MAKING JOINTS.
No. 605,195. Patented June 7, 1898.
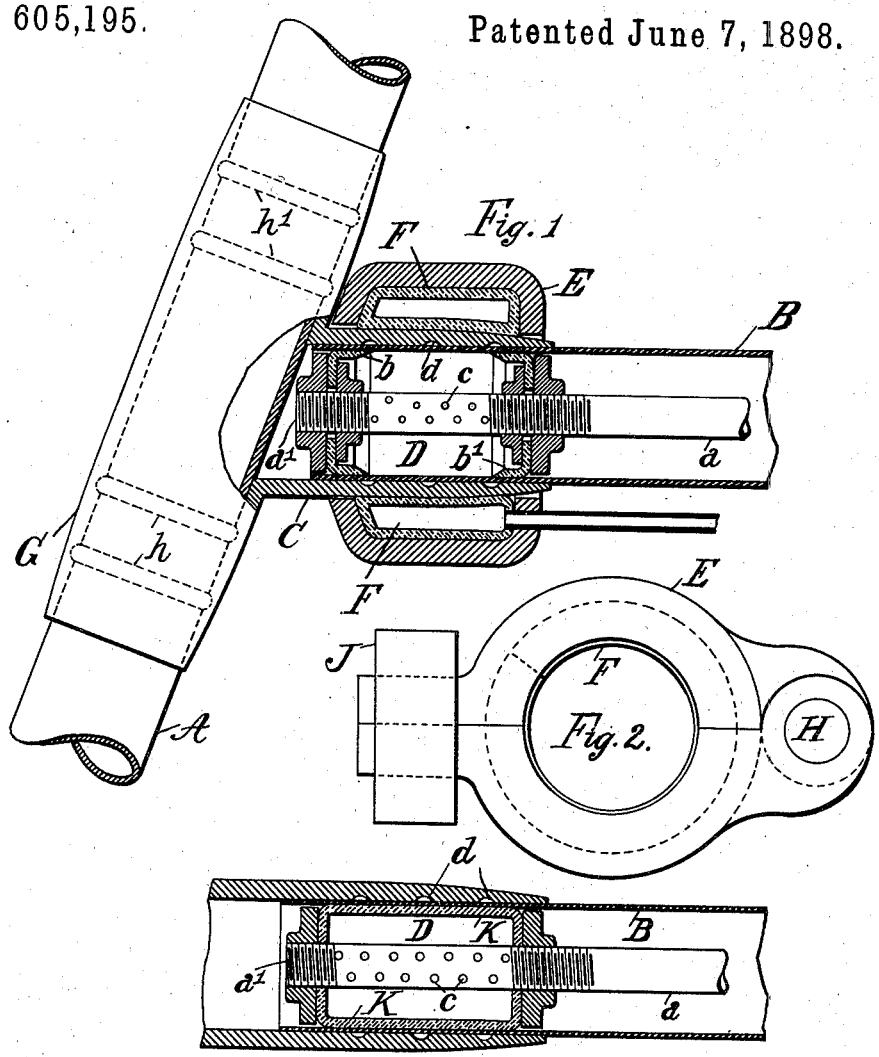

UNITED STATES PATENT OFFICE.

JOHN BIRTWISLE, OF MANCHESTER, ENGLAND.

TOOL FOR MAKING JOINTS.

SPECIFICATION forming part of Letters Patent No. 605,195, dated June 7, 1898.

Application filed August 26, 1897. Serial No. 649,644. (No model.) Patented in England March 29, 1897, No. 7,987.

*To all whom it may concern:*

Be it known that I, JOHN BIRTWISLE, a citizen of the United Kingdom of Great Britain and Ireland, residing at Manchester, in the county of Lancaster, England, have invented certain new and useful Improvements in Tools for Making Joints, (for which I have obtained Letters Patent in Great Britain, No. 7,987, dated March 29, 1897,) of which the following is a specification.

This invention has reference to apparatus for joining tubes to sockets and the like, and is especially applicable for joining together the members of cycle-frames without the use of heat, such as is necessary for brazing, and in a simple and efficient manner.

In using this invention the tube is placed within or upon the socket or the like to which it has to be secured and local hydraulic or other fluid-pressure, hereinafter referred to as "hydraulic" pressure, is applied by means of my apparatus, so as to cause the expansion or contraction of one of the members to be joined together, the other member being preferably provided with recesses or the like, with which the expanded or contracted part may key or engage.

The accompanying drawings, to which I will hereinafter refer, illustrate in what manner my invention may be carried into effect as applied to a bicycle-frame.

Figure 1 is a sectional elevation of a joint, showing the apparatus in place. Fig. 2 is an end elevation of a modified outer tool. Fig. 3 shows a modified inner tool. Fig. 4 shows a tube being compressed upon a socket.

Fig. 1 shows, partly in section and partly in elevation, one of the lugs which may be employed for securing together the head-tube A and the top tube B of an ordinary diamond-frame bicycle. The end of the tube B is placed within the branch C of the lug or socket as if it were to be brazed or soldered in the usual manner, a tight and close fit being preferred. The tool or instrument indicated at D is then introduced within the tube. This tool consists of a tube $a$, which may, if desired, be flexible and the end of which carries, in any suitable manner, the cup-leathers or like devices $b\ b'$. These leathers are supported by collars which are preferably adjustable on the tube and are arranged at a convenient distance apart, and the tube between them is perforated, as shown at $c$, or is otherwise provided with access to its interior. The extreme end $a'$ of the tube is closed.

The tool is placed in the position shown, and the tube $a$ is placed in communication with a supply of water under heavy pressure or is connected to a suitable pump or the like. The water or other fluid passes into the space between the cup-leathers $b\ b'$, which close up against the tube B and prevent the escape of any of the water. The active pressure of the water is therefore radial, and parts of the tube B are expanded into convenient recesses, grooves, corrugations, keyways, or the like $d$, formed in the socket C, to which they conform perfectly. The remainder of the tube acted upon by the water is forced dead against the smooth parts of the socket. The grooves or the like D are preferably so formed as to prevent movement of the expanded tube end in any direction. This may be conveniently effected by causing the grooves to cross one another. After the application of a suitable pressure, which may be indicated by a gage connected to the tube $a$, the water-pressure is relieved and the tool is withdrawn. I have found with a tube of soft steel 22 Birmingham wire-gage and a diameter of one and a quarter inches that a pressure of from one and a half to two tons per square inch is sufficient to effect a joint. This pressure will of course vary according to the diameter of the tube and the material from which it is formed and the width of the grooves into which it has to be forced. In the example to which I refer the grooves were about a quarter of an inch wide and about three thirty-seconds of an inch deep, the edges and corners being rounded, so as not to cut the tube. With the employment of great pressures, however, there is a danger that the surrounding socket, especially when light and thin, may be burst or broken when the tube end is expanded. To lessen this danger, I prefer to employ the second tool or device illustrated at E in the same figure, although it will be understood that under certain circumstances and when desired the first tool may be employed alone. This second tool consists of a suitable and sufficiently strong shell or the like E, which is capable of being slipped or otherwise arranged upon the socket C, so as to surround it. Contained within the shell E is a closed pipe or ring F, capable of resisting water under heavy pressure and constructed of some flexible material, such as leather, suitably treated, or of india-rubber and strong insertion. Water under pressure and preferably from the same source is admitted into the ring F simultaneously with the admission of water under pressure to the tool D. A balanced pressure is thus set up on each side of the socket, and the greatest pressures can be used without fear of damage, as the only parts capable of expansion are the parts of the tube B which come over the grooves or the like in the socket. Instead of being provided with the ring F the tool E may have internal cup-leathers to prevent the escape of water, in which case the water would come directly into contact with the external face of the socket. The tool E is of such proportions and is so arranged that its pressure-exerting part covers that part of the tool D at which active pressure is exerted. It is preferred to so construct and arrange this latter tool that its cup-leathers come against parts of the tube which cannot be expanded.

If desired, the socket may be simply supported externally by removable encircling rings or the like.

The socket G illustrates the method of securing a tube, such as a head-tube A, in place by expanding it at any convenient point in its length instead of merely inserting and expanding its end. The tube is placed in position, and the parts of the tube at the points h h' are expanded, as hereinbefore described, into suitable grooves or the like in the socket G, the tool E of course being placed around the parts to be expanded, if desired.

In some instances it will not be possible to slide the tool E into position, as already described, owing, perhaps, to a socket being already connected to one end of a tube when a joint has to be made at the other end. To meet such a case, the modified tool E (shown in Fig. 2) may be employed. In this modification the shell E is divided, and the two halves are connected together, as by a hinge H, so that it is capable of being opened and placed in position around any joint. The ring F would have its ends closed, but not connected together, so that it also could be opened with the shell, its ends abutting together when the tool is in use. The tool may be maintained in its closed position by the removable ring J. This tool, like the one shown in Fig. 1, is designed to be used with fluid-pressure inside the ring F.

In the modified form of tool shown in Fig. 3 the space D may be surrounded by a flexible water-tight tube K, capable of expanding and following parts of the tube B into the grooves d of the socket.

It is obvious that my invention is equally applicable to a joint in which the external member is contracted upon the inner one. In fact, in the example shown in Fig. 1, where the two tools are used, the socket would be contracted upon the tube if the strength of the latter were superior to that of the former. With the balanced pressure the weaker member must move and the grooves or the like would be formed in the stronger. In the case of a tube the end of which is slipped over a socket the tool E is put in place and pressure is applied to contract the end of the tube upon the socket and force certain parts into grooves or the like prepared for their reception, the tool D being used as a support, if desired, for a hollow socket. This method of making the joints will be perfectly obvious; but I have illustrated it in Fig. 4.

Many other forms of joints than those illustrated may be formed according to this invention by placing a tubular part within or upon a suitable socket and by expanding or contracting it by local hydraulic or similar pressure and by the tools or tool described.

Equally, of course, my invention is applicable to the formation of tubular joints other than those of bicycle-frames and possesses especial value for aluminium and similar joints which cannot well be brazed.

In some cases in the construction of a bicycle-frame it may be necessary to form openings in parts of the sockets, so as to permit the insertion or withdrawal of the tool D; but this will only rarely be necessary.

Tubes and the like joined as herein described are not damaged by heat and are as strong at the joint as at any other part.

If desired, the parts to be joined may be tinned or the like and may afterward be subjected to a gentle heat to melt the solder, thus preventing the access of water and subsequent corrosion, or the joint may be otherwise protected by enamel or the like after it has been made.

Having now described my invention, I declare that what I claim is—

1. In apparatus for making tubular joints by fluid-pressure, a tool for applying such pressure to a short portion of a tube, comprising a pipe having a perforated portion, a collar at each end of said perforated portion, said collars being smaller in diameter than the tube, and means for making fluid-tight joints between the inner surface of the tube and the collars, substantially as described.

2. In apparatus for making tubular joints by fluid-pressure, a tool for applying such pressure to a short section of a tube, comprising a pipe having a perforated portion, and a flexible water-tight tube, surrounding said portion and adapted to enter the joint, substantially as described.

3. An apparatus for making tubular joints, consisting of an internal tool D comprising a perforated pipe $a$ carrying two packed collars and closed at one end $a'$, and an external tool E comprising an annular shell containing the closed annular pipe F of flexible material, and means for conveying fluid-pressure into the pipes $a$ and F.

In testimony that I claim the foregoing as my invention I have signed my name, in presence of two witnesses, this 5th day of August, 1897.

JOHN BIRTWISLE.

Witnesses:
GEO. HEYS,
ARTHUR MILLWARD.